F. W. AND G. A. ROBERTSHAW.
THERMOSTATIC VALVE MECHANISM.
APPLICATION FILED MAY 21, 1919.
1,339,368.
Patented May 4, 1920.
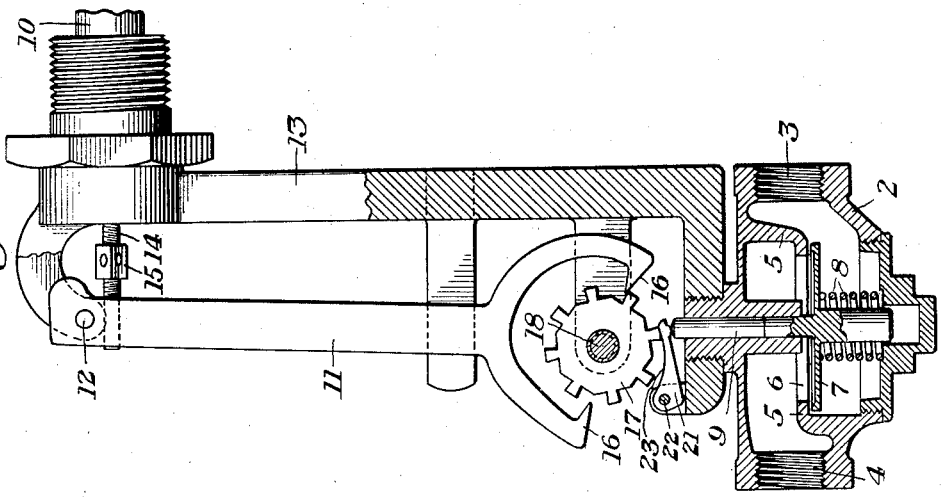
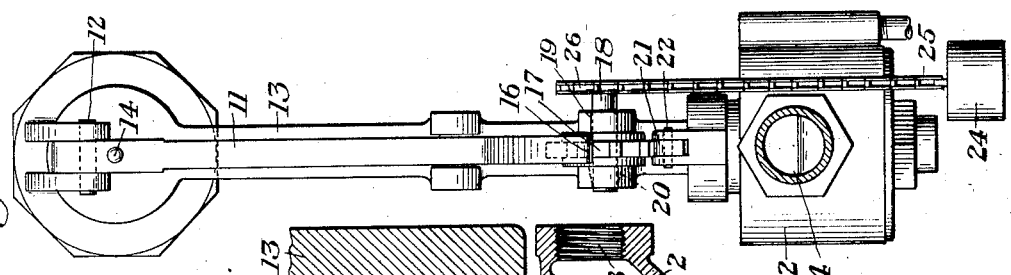
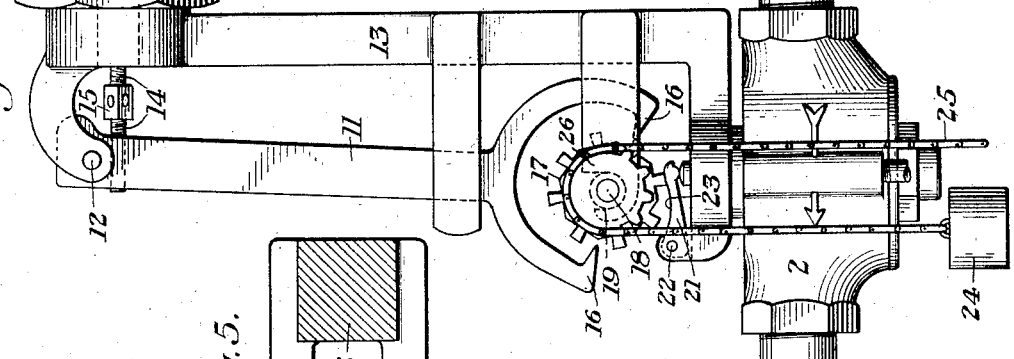
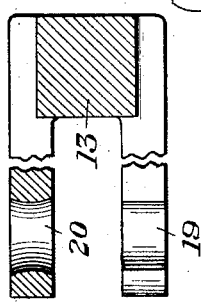

UNITED STATES PATENT OFFICE.

FREDERICK W. ROBERTSHAW, OF PITTSBURGH, AND GEORGE A. ROBERTSHAW, OF GREENSBURG, PENNSYLVANIA.

THERMOSTATIC VALVE MECHANISM.

1,339,368.  Specification of Letters Patent.  Patented May 4, 1920.

Application filed May 21, 1919. Serial No. 298,695.

*To all whom it may concern:*

Be it known that we, FREDERICK W. ROBERTSHAW and GEORGE A. ROBERTSHAW, both citizens of the United States, residing, respectively, at Pittsburgh, Allegheny county, Pennsylvania, and Greensburg, Westmoreland county, Pennsylvania, have invented a new and useful Improvement in Thermostatic Valve Mechanism, of which the following is a full, clear, and exact description, reference being had to the accompanying drawing, forming part of this specification, in which—

Figure 1 is a side elevation of valve mechanism embodying our invention.

Fig. 2 is an end view of the same.

Fig. 3 is a view similar to Fig. 1 but with certain of the parts in vertical section.

Fig. 4 is a detail sectional view showing another position of the escapement device, and Fig. 5 is a detail sectional view showing the bearing for the shaft of the escapement wheel.

Our invention has relation to thermostatic valve mechanism for use in connection with water and other heaters; and is designed to provide a simple and efficient mechanism of this character which will insure the temperature in the heater being kept at substantially the desired point.

The nature of our invention will be best understood by reference to the accompanying drawings in which we have shown a preferred embodiment thereof and which will now be described, it being premised, however, that various changes may be made in the details of construction, arrangement and combination of the various parts without departing from the spirit and scope of our invention as defined in the appended claims.

In these drawings, the numeral 2 designates a valve casing having an inlet opening at 3 and an outlet opening at 4. The interior of the casing is formed with a partition 5 having the port 6 therethrough which is controlled by the upwardly seating valve 7. This valve is normally held seated by the action of a spring 8. The valve is provided with an upwardly projecting stem 9 which projects in a position to be engaged by the mechanism now to be described.

10 designates a thermostat of any suitable character such, for instance, as the thermostat described and claimed in the patent of F. W. Robertshaw, No. 864,263, dated August 27, 1907, and which is adapted to extend into the heater or other receptacle wherein the temperature is to be controlled and which is supplied with fuel under the control of the valve 7. 11 is an escapement lever which is pivoted at 12 to a supporting arm 13 to which the thermostat 10 is also secured. The lever 11 is engaged adjacent to its pivot by a connection 14 with the carbon element of the thermostat. The connection 14 consists of a double-threaded screw bolt having an adjusting nut 15. The lower end of the lever 11 is bifurcated and formed with opposite escapement dogs 16 which are adapted to coact with the teeth of an escapement wheel 17. This escapement wheel is secured to a short shaft 18, one end portion of which rests in the open bearing 19 and the other end portion of which is seated in the bearing 20 which is shaped to give such shaft some play in a vertical direction. 21 is a lever pivoted at 22 and having an end portion which contacts with the upper end of the valve stem 9 between said stem and the escapement wheel 17. The upper surface of this lever is curved, as indicated at 23. This lever is so constructed and arranged that when the escapement wheel is in the position shown in Figs. 1 and 3, one of the teeth of said wheel acts upon said lever to depress the valve stem 9 and thereby open the valve 7. When, however, the teeth of the wheel are in the position shown in Fig. 4, the adjacent tooth will rest in the curve at the upper side of the lever 21 and the spring 8 will hold the valve 7 closed.

The shaft 18 is provided with a suitable motive device for overcoming the action of the spring 8 and causing the wheel 17 to turn when released by the escapement in the manner presently described. In the form of our invention which we have illustrated, this motive device consists of a weight 24 attached to the end of a chain 25 which is hung upon the teeth of a sprocket wheel 26 on one end portion of the shaft 18. The operation is as follows:

As long as the temperature within the heater is below the predetermined degree, the thermostat acts through the connection 14 to hold the lever 11 in the position shown in Figs. 1 and 3, in which one of the teeth of the escapement wheel is acting upon the valve stem 9 to hold the valve 7 open. As the temperature rises to the predetermined point, the movement of the thermostat causes the lever 11 to be moved to the position shown in Fig. 4, thereby releasing the right hand pawl 16 of the escapement device, and moving the left hand pawl of that device into position to engage with the next tooth. The weight 24 then acts to rotate the wheel 17 to the position shown in Fig. 4, in which the spring 8 is free to close the valve. The valve will remain closed until the temperature again falls to a position to reverse the escapement.

The weight will continue to act until the end of the chain 25 passes entirely off from the sprocket wheel 26. The weight will then drop free and the device will not again operate until the chain is reëngaged with the sprocket wheel. Inasmuch, however, as a valve device of this kind should be frequently inspected, the fact that the weight needs replacing at intervals is an advantage rather than otherwise, since it gives the necessity for a somewhat regular inspection. As soon as the weight falls when the end of the chain is reached, there is nothing to overcome the action of the spring 8 and the latter will immediately act to close the valve, the shaft 18 lifting in its open and loose bearings for this purpose. This is the reason this character of bearing is provided for said shaft. The valve will therefore automatically close and remain closed until such time as the weight is replaced. This effectively prevents overheating when the device ceases to act.

The advantages of our invention will be apparent to those familiar with thermostatic valves of this character since it provides extremely simple, efficient and reliable mechanism by means of which a heater may be kept at the desired temperature. It will be noted that the gas valve is practically instantaneously opened and closed so that the gas is either all on or off, no partially open position of the valve being possible.

It will be readily understood that the gas valve may be of any desired construction or arrangement; and that the means by which the escapement device is caused to act upon the valve may be widely changed.

We claim:

1. In thermostatic valve mechanism, the combination with a gas valve and a thermostat, of a spring device acting upon the valve in one direction, a motive device acting upon the valve in the opposite direction, and an escapement device controlled by the thermostat and controlling the operation of the motive device, substantially as described.

2. In thermostatic valve mechanism, the combination with a gas valve and a spring normally tending to close said valve, of an escapement wheel, a motive device arranged to act on said wheel, an escapement lever coöperating with said wheel, and a connection between said lever and the thermostat, substantially as described.

3. Thermostatic valve mechanism, comprising a valve, a spring acting upon said valve in one direction, an escapement wheel arranged to act upon the valve in opposition to the spring, a motive means for said wheel, a pivoted escapement lever coacting with the wheel, a thermostat, and an actuating connection between said lever and one element of the thermostat, substantially as described.

4. Thermostatic valve mechanism comprising a valve, a spring for actuating the valve in one direction, a lever member for actuating the valve in the opposite direction, an escapement wheel arranged to coöperate with said lever, an escapement lever, and thermostatic means for actuating the lever, substantially as described.

5. Thermostatic valve mechanism comprising a valve, a spring for closing the valve, a lever engaging the stem of the valve, said lever having a recessed or depressed portion, an escapement wheel having teeth which in one position engage said lever and in another position rest in the recess or depression thereof, an escapement lever for operating the said wheel, and thermostatic means for actuating said escapement lever, substantially as described.

6. Thermostatic mechanism comprising a valve, a spring for moving the valve in one direction, an escapement wheel arranged to effect the operation of the valve in the other direction, said wheel being movable in its bearings toward and away from the valve, a weight operatively connected with said wheel, an escapement lever co-acting with said wheel, and thermostatic means connected to said lever, substantially as described.

In testimony whereof we have hereunto set our hands.

FREDERICK W. ROBERTSHAW.
GEORGE A. ROBERTSHAW.